United States Patent [19]

Wolf et al.

[11] 3,760,391

[45] Sept. 18, 1973

[54] DATA CARD TRANSPORT AND SCANNING APPARATUS

[75] Inventors: Edgar Wolf, New Hyde Park; Edward Lau, Old Westbury; Arthur Eisenkramer, Port Washington, all of N.Y.

[73] Assignee: Redactron Corporation, Hauppauge, N.Y.

[22] Filed: Dec. 9, 1971

[21] Appl. No.: 206,486

[52] U.S. Cl...............340/174.1 C, 179/100.2 CA, 179/100.2 T; 235/61.12 M

[51] Int. Cl........................... G11b 5/10, G11b 19/02

[58] Field of Search............................ 340/174.1 C; 235/61.12 M; 179/100.2 CA, 100.2 T

[56] References Cited

UNITED STATES PATENTS

| | | | |
|---|---|---|---|
| 3,296,605 | 1/1967 | Raddin et al. | 340/174.1 C |
| 3,566,381 | 2/1971 | Boslik et al. | 340/174.1 C |
| 3,504,186 | 3/1970 | Feld | 235/61.12 |
| 3,480,934 | 11/1969 | Miller et al. | 340/174.1 C |

*Primary Examiner*—Vincent P. Canney
*Attorney*—Alan K. Roberts et al.

[57] ABSTRACT

A data card transporting apparatus for scanning a data card is provided which includes a head adapted for selectively scanning one of a plurality of data channels on the card, said head being driven by a lead screw which in turn is driven incrementally by a solenoid actuated device, which includes pins mounted on a disc and driven by pawls in either of two rotary directions to drive the lead screw. A drive is provided for the data card which consists of a capstan on each side of the card with which there is provided a cooperating pinch roller which is actuated by the use of a corresponding solenoid. An ejection mechanism is also provided which consists of a lever which engages an end of the card when the latter is in fully inserted position, the lever being solenoid actuated to impel the card to a position whereat it may be engaged by one of the aforesaid capstan and pinch roller arrangements. Additionally, the head is especially arranged to be accommodated in a trough provided in the bed of the device so that the card, in effect, is pressed into the trough by the head to provide for optimum contact conditions.

7 Claims, 6 Drawing Figures

Patented Sept. 18, 1973 | 3,760,391

3 Sheets-Sheet 1

DATA CARD TRANSPORT AND SCANNING APPARATUS

FIELD OF INVENTION

This invention relates to data card processing apparatus and more particularly to apparatus for passing data cards back and forth under a scanning head for purposes of reading and/or writing data which is represented in digital form.

SUMMARY OF THE INVENTION

It is an object of the invention to provide an improved data card transport system preferably for use in connection with the magnetic recording and reading of data.

It is another object of the invention to provide a general purpose multi-track reading and writing device which permits the use of tab size magnetic cards.

It is a further object of the invention to provide an improved data card processing system having a relatively large memory with a satisfactory access time.

Yet another object of the invention is to provide an improved data card processing apparatus which constitutes a peripheral piece of equipment that can be readily interfaced with other electronic support equipment.

Still another object of the invention is to provide an improved data card processing device which is readily modified to include appropriate options and which has a low error rate.

In achieving the above and other objects of the invention, there is provided a data card transport and read/write apparatus comprising a first means to receive a card having multiple parallel data tracks thereon, second means to displace the thusly received card in opposite directions, third means to scan a track on the thusly displaced card for purposes of reading and/or writing data thereon, and fourth means for incrementally stepping said third means from track to track.

The third means mentioned hereinabove may include a lead screw and a track scanning head coupled to said screw and responsive to rotation of the latter for being displaced from track to track, the fourth means in this case incrementally rotating the aforesaid screw.

In accordance with the invention, the fourth means mentioned hereinabove may include a disc mounted on the aforementioned lead screw with pins being provided on this disc parallel with the screw, members being selectively operable to engage and displace said pins to rotate the screw in one of two opposite rotary directions, and solenoids to actuate the aforesaid members.

The disc mentioned above may be provided with peripheral notches corresonding in number to the aforementioned pins with the fourth means mentioned above including a rider adapted to engage sequentially in these notches to hold the disc and thus the lead screw in positions whereat the head is aligned selectively with respective of said tracks. Means may be provided resiliently bearing against this rider to maintain the same in the notches, and arms may be provided on the members to act against the latter said means to release the rider in anticipation of and concomitantly with the displacement of the pins by the members.

According to a feature of the invention a manget may be provided on the rider and a reed switch or other sensing means may be provided adjacent the magnet to determine when the rider is in and out of the aforementioned notches.

The members mentioned above may be hook-shaped pawls pivotally arranged on opposite sides of the disc and adapted for displacement from a rest position to sweep the pins through a limited displacement until the rider engages in a notch and then to return to said rest position. The fourth means may include springs allowing the hook-shaped pawls to brush past the pins on returning to said position of rest. The disc is maintained in stationary attitude by engagement of the rider in one of the aforementioned notches while the members brush past the pins.

According to a further feature of the invention, the second means mentioned hereinabove may include continuously operating and oppositely rotating wheels or capstans and cooperating pinch rollers adapted for engaging a data card at opposite side edges thereof to drive the card back and forth. Solenoids may be coupled to the pinch rollers for selectively actuating the same.

A means may be provided establishing an inserted limit for the card and photoelectric detectors may be employed to determine the entry of a card into the first means and the positioning of a card at the inserted limit thereof.

A pivot arm may be provided including one end engaged by and displaced by the aforementioned head, said pivoted arm including a second end having an indicator thereon and an index cooperating with the indicator to indicate the track being scanned.

According to another feature of the invention, the data card inserted into a system may have cooperating therewith a lever to eject the same from said position of rest, there being provided a solenoid to actuate the lever.

According to still another feature of the invention, there may be provided a cantilever spring mounted for the head, the first means mentioned above including a bed over which said card passes, the bed being provided with a trough corresponding with said head such that the head presses the card into the trough to insure optimum contact conditions.

The above and other objects and features of the invention will be better understood from the detailed description of a preferred embodiment as illustrated in the accompanying drawings, in which:

DETAILED DESCRIPTION

In accordance with the invention and as will be seen in greater detail hereinafter, recording takes place by the moving of a magnetic card past a magnetic head under the control of one of two capstan-pinch roller combinations. Assuming, for example, that the card is at rest against a rear stop mechanism or fence, engaging the forward pinch roller will cause the card to be driven by the associated constantly rotating capstan. When the card has reached its full speed of travel which requires some distance to accomplish, the card covers a photocell to be described hereinafter and writing commences. At the end of the message, writing terminates and the forward pinch roller is released. The card is permitted to overcoast slightly and then the reverse pinch roller is engaged to drive the card back to the rest position, at which time, this particular pinch roller is released. As will be seen, the card has a cut edge and the geometry of the card, card bed and capstan pinch rollers is such that the card leaves the reverse capstant control at the cut edge of the card just before the card reaches the rear fence and such that, in this circumstance, the forward capstan pinch roller combination can still engage the card for the next forward motion.

Figures 1, 2:
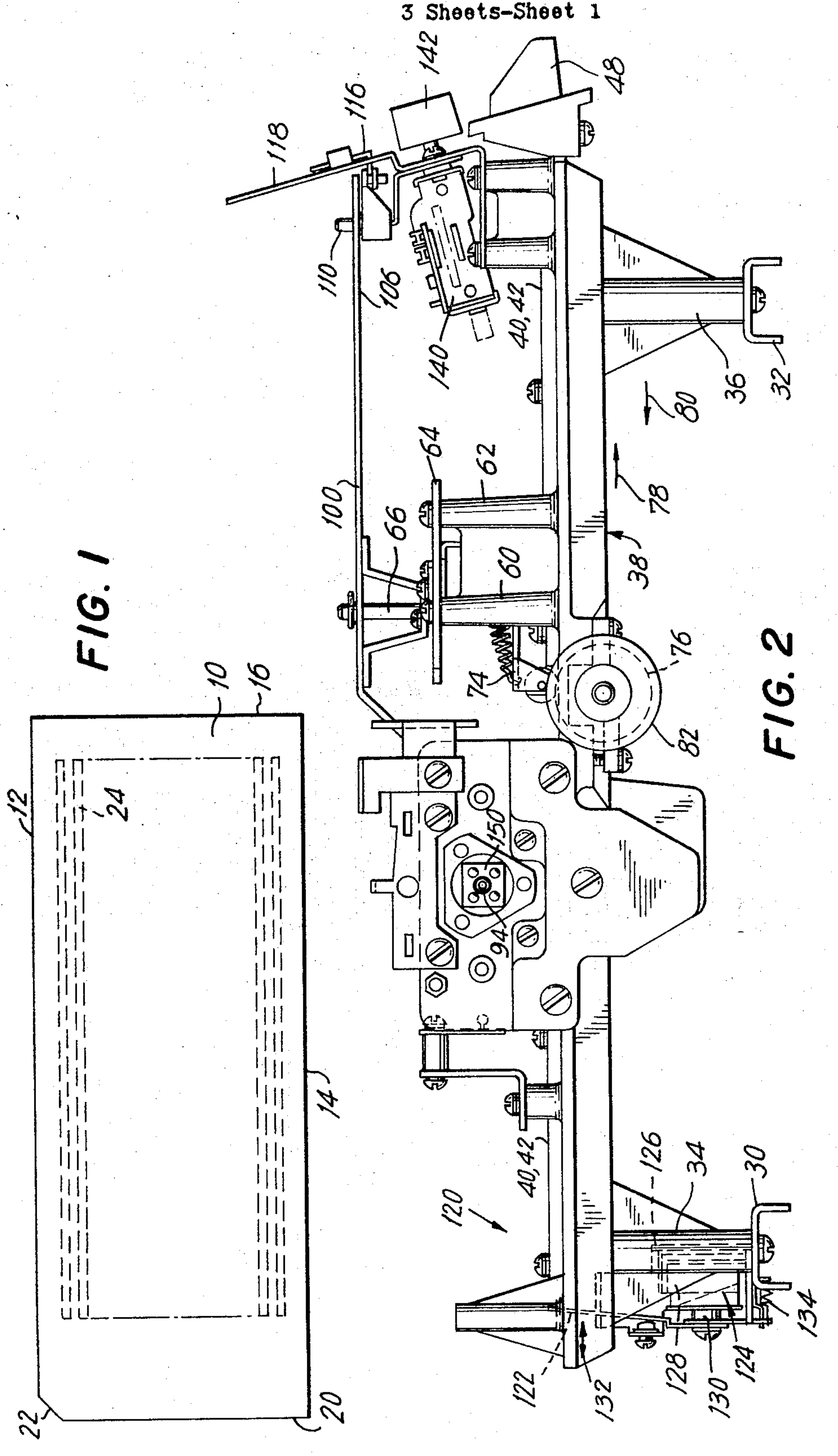
FIG. 1 is a top plan diagrammatical view of a multiple track data card employed in the apparatus of the invention.
FIG. 2 is a side view of a device provided in accordance with the invention and serving as a data card transport and scanning apparatus, part of the apparatus being removed for purposes of showing the components otherwise concealed thereby.

FIG. 1 illustrates a card 10 employed in the apparatus of the invention. This card is generally rectangular in shape having side edges 12 and 14 as well as ends 16 and 20, the end 20 being provided with a cut out corner 22. The card may have a plurality of magnetic record tracks 24 and the card may be fabricated, for example, as an oxide covered Mylar card.

Preferably, the magnetic card used in the apparatus of the invention is a certified computer grade card, which can be written on or read from, for example, several thousand times before a non-recoverable error occurs. The card, for example, may be 7.375 inches long and 3.250 inches wide and a thickness of 0.0083 inches. The maximum recording length on this example card is 6.425 inches and the card preferably has 64 tracks or lines with a maximum of 160 characters being recordable per line with 8 bits per character.

It will be appreciated that such characteristics are given by way of example only and, are not intended to limit the invention or the cards employed in accordance therewith in any manner whatsoever.

Figure 3:
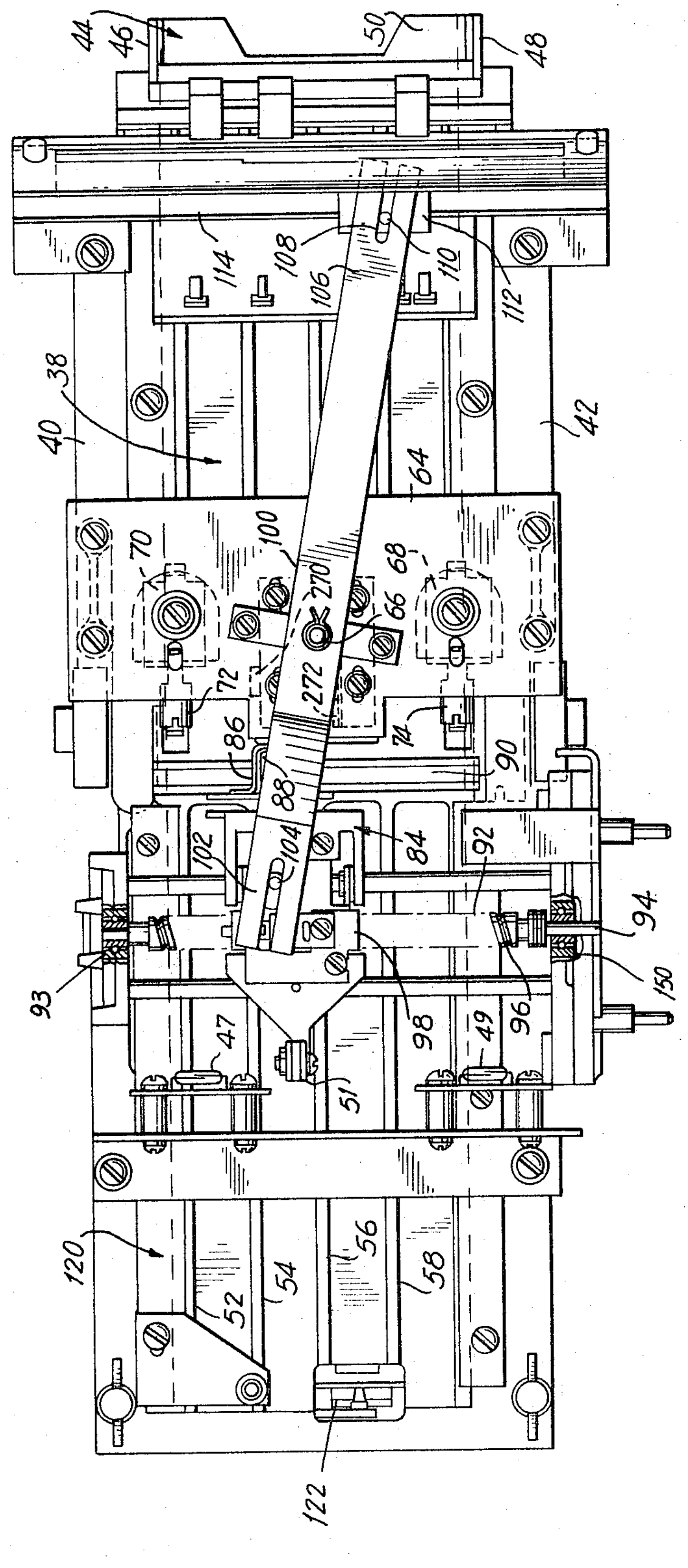
FIG. 3 is a top plan view of the apparatus illustrated in FIG. 2.

FIGS. 2 and 3 show generally a major portion of the apparatus of the invention for handling a card of the above-indicated type. In these Figures, it will be seen that there is provided generally mounting brackets 30 and 32 atop which are posts or stands 34 and 36 supporting the card bed generally indicated at 38. The card bed includes side guides 40 and 42 and there is provided, further, a card insert guide 44 having side members 46 and 48 as well as a ledge 50. Bed 38 is moreover provided with a plurality of parallel and longitudinally disposed ridges 52, 54, 56 and 58 by means of which contact between a data card and the bed is decreased for purposes of minimizing frictional contact between the card and said bed.

To the right of center of the bed 38 are provided upright posts 60 and 62, these supporting a plate 64 atop which is mounted a pivot post 66. This arrangement supports solenoids 68 and 70 in turn supporting and controlling pinch roller mechanisms 72 and 74 which will be described in further detail hereinafter. These pinch roller mechanisms cooperate with capstans such as indicated at 76 to provide a card drive for displacing a data card in forward direction as indicated by arrow 78 or in reverse direction as indicated by arrow 80. The capstans are driven by associated pulleys such as indicated at 82 which, in turn, may be driven by a train of pulleys and a cooperating belt and a motor (not shown).

A magnetic head supporting frame is indicated generally at 84, a bracket 86 thereon supporting the head 88 in such a manner that the head can be accommodated in a groove 90, in an arrangement to be discussed in greater detail hereinafter.

A rotatable lead screw 92 is provided which is mounted for rotation in bearings 93 and 150, and which terminates in a shaft or pin 94, said shaft being driven in a manner which will be indicated in greater detail hereinafter.

The lead screw 92 is provided with a helical groove 96 in which is accommodated a follower mechanism (not shown) mounted on a follower 98 on which the head supporting frame 84 is mounted. As a consequence of this arrangement and as will be discussed in greater detail hereinafter, the follower 98 can be displaced axially along the lead screw 92, carrying along with it the frame 84 as well as the head 88. This enables the head to be moved from track to track with respect to a data card inserted into the system, whereupon writing or reading can be selectively directed to a specific track on the data card and displaced from track to track thereupon.

A level 100 includes a slotted end portion 102, the slot of which engages a pin 104. This pin is mounted on a member connected to the follower 98 as a consequence whereof the lever 100 is pivoted on the pin 66 with a movement which corresponds to displacement of the card scanning magnetic head 88.

The lever 100 has a second end 106 provided with a slot 108 engaging a pin 110 which is mounted on a member 112 which rides along a track 114. An indicator 116 which extends through a plate 118 cooperates with an index on the latter to give an indication of the specific track at which the magnetic head is located for purposes of scanning at any given time.

At the end of the apparatus generally indicated at 120, whereat is located the position of rest of a card which has been fully inserted into the apparatus, is located a lever 122. This lever is coupled to and generally controlled by a solenoid indicated at 124 which is mounted on a bracket 126 and includes a winding 128 and an armature 130. The lever 122 is shown in its foremost position and is capable of being displaced as indicated by the arrow 132. Generally, the lever is spring loaded by a spring 134 to assume its rearmost position whereupon it can be actuated by the solenoid 124, to assume the illustrated position for purposes of ejecting a card or in other words displacing the card forwardly so that it will be engaged by and further displaced by the pinch roller capstan arrangement referred to hereinabove.

It will be readily understood that the solenoids referred to hereinabove, as well as solenoids to be mentioned hereinafter, are controlled by electrical signals. These electrical signals can be provided by manually actuated switches or by associated computer equipment of a type too well known to warrant discussion here. However, for purposes of example, one or more switches such as indicated at 140 may be provided at the front end of the apparatus or at any other suitable location, push-buttons such as at 142 serving the purpose of generating signals which may, for example, include an eject signal which will operate, for example, the solenoid 124.

Figure 4:
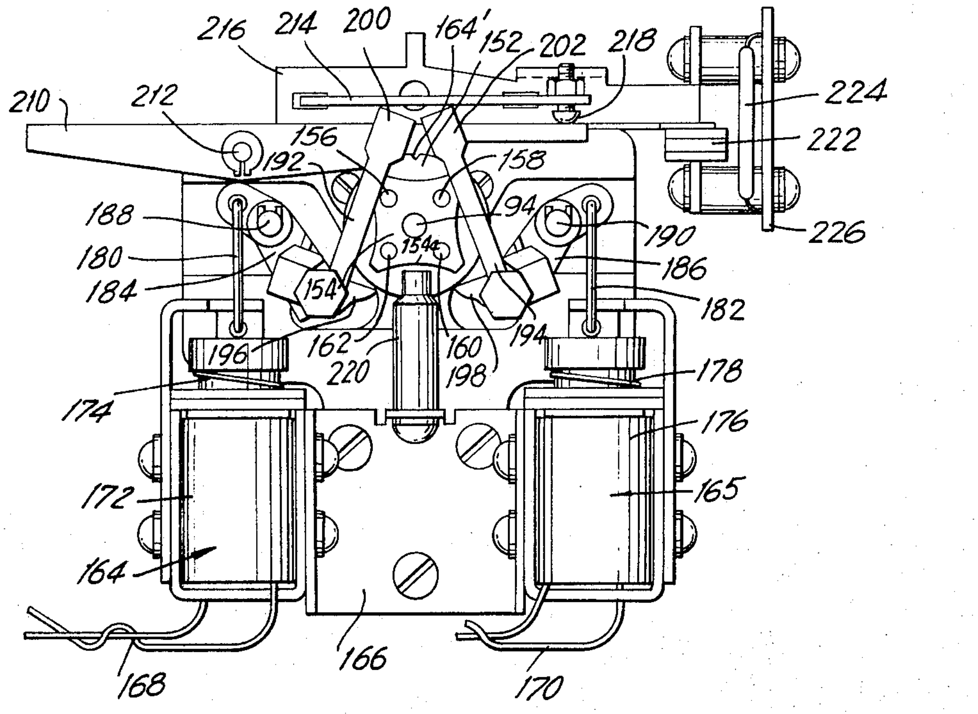
FIG. 4 is a view on enlarged scale of the apparatus removed from FIG. 2, which apparatus serves the purpose of incrementally driving the scanning head employed to read and/or write data on data cards.

As mentioned hereinabove, the head employed in the apparatus of the invention is capable of being displaced from track to track, such displacement being effected by the use of a lead screw 92 provided with a spiral or helical groove 96. As wasl also mentioned hereinabove, this lead screw is terminated in shaft 94 for purposes of rotation. The shaft 94, it will be seen, is supported in a bearing arrangement 150. FIG. 4 illustrates how the shaft 94 is rotated incrementally to step the aforementioned magnetic head from track to track.

More particularly, the shaft 94 is coupled with a disc 152 and to a member 154, all of these elements 94, 152 and 154 being coupled together for simultaneous rotation, as a consequence whereof the shaft 94 can be rotated through engagement of pins 156, 158, 160 and 162 mounted on the member 154 and thus effectively on the disc 152.

The disc 152 is provided with a plurality of notches or detents 164' corresponding in number to the number of pins mentioned above. Thus, in the illustrated embodiment, four pins are employed and, as a consequence, four notches 164 are peripherally arranged on the disc 152 midway between the corresponding pins. At the same time, it will be noted that the pins are regularly spaced with respect to the axis of the shaft 94 and are arranged at equal distances therefrom so as to lie upon an imaginary circle which is concentric with the shaft 94.

Solenoids 164 and 165 provide the drive for the shaft 94. These solenoids being mounted on a support bracket 166 and having input leads 168 and 170 which enable the introduction of an input signal.

Solenoid 164 includes a winding 172 and an armature 174 whereas solenoid 165 includes a winding 176 and an armature 178.

The aforementioned armatures are connected via rods 180 and 182 to arms 184 and 186 respectively pivoted at 188 and 190. As a consequence, operation of the solenoids will cause the corresponding arms to be pivoted.

Connected to the aforementioned arms and pawl members 192 and 194 bearing hook-shaped portions 196, 198, as well as heads 200 and 202. The members 192 and 194 are generally spring loaded members which are carried along with their respective arms but which are pivotally displaceable in order to permit a brushing action, as will be indicated hereinafter.

As will be apparent from an inspection of the drawing, the solenoids 164 and 165 are intended to rotate the shaft 94 in opposite rotary directions, as a consequence of which each solenoid can be operated only to the exclusion of the other. Considering, for example, the actuation of solenoid 164, this will cause an actuation of armature 174 which will operate through rod 180 to cause a pivoting of arm 184. This will raise the hook-shaped portion 196 of pawl 192 around pivot 188 in such a manner that, for example, pin 162 will be engaged and swept generally in a direction which is clockwise relative to the axis of shaft 94.

As the shaft 94 and members 152 and 154 are rotated, a convex end portion (not shown) of arm 184 comes into engagement with a concave face 154a of member 154, thus halting the motion. At this point, the full rotation has been reached, and the disc 152 is very near its new final position, ready for the detent action to take over. De-activation of solenoid actuation now allows the armature be spring restored, thus pushing up on rod 180, causing arm 184 to swing counterclockwise. (The convex end face of 184 and the convex faces of 154 are portions of a circle about 188; thus when the restore motion occurs, there are no interferences at these facets.)

At some position the hook-shaped portion will sweep past the pin 162 and will leave the same deposited in its new position, which will be the position illustrated at 156 in the drawing in the illustrated set up. On return of the member 192 with the arm 184 to a position of rest, the spring loading of the hook-shaped portion 196 will enable the same to brush past any pin which is in a position of interference so that the configuration can return to that which is illustrated.

For purposes of adequately and securely locating the shaft 94 and therefore the associated lead screw, the notches or detents 164 mentioned hereinabove are employed. For this purpose, there is provided a member or rider 210 pivoted on pin 212 and having a portion suitably adapted to fall into a notch 164' when an alignment is effected. The member 210 is pivoted to cause the aforesaid engagement by means of a wobble plate 214 supported on a member 216 and bearing against the lever 210 by means of a head 218. The wobble plate 214 is loaded by a spring (not shown) so that the head 218 pushes the lever 210 downwardly in such a manner as to engage in the aligned notch 164'.

As has been mentioned hereinabove the members 192 and 194 are provided with heads 200 and 202. On upward motion of the members 192 and 194 respectively, thewobble plate 214 is engaged by the displaced head 200 or 202 thereby releasing the lever 210 and permitting disengagement from the notch 164' so that the hook-shape members can operate to displace the associated pins connected with the disc 152. For this purpose the distance between the heads 200 and 202 and the wobble plate 214 is less than that between the hook-shaped portions 196 and 198 and the aforementioned pins, so that the wobble plate is displaced before engagement is effected with the pins.

For purposes of minimizing wear as between the pawls and the pins mentioned above, an oiler 220 is provided having a wick which brushes against the pins as they move past thereby reducing friction to a minimum.

It is of interest in connection with the apparatus of the invention to be able to indicate when the magnetic head is appropriately positioned over a track on the card being processed. For this purpose there is mounted in cantilever arrangement at the end of lever 210, a magnet 222. In cooperative relation with the magnet is mounted a reed switch 224 supported on a bracket 226 and of a construction, for example, which is commercially known or which is shown in copending application Ser. No. 116,850 filed Feb. 19, 1971. The position of the magnet 222 relative to the reed switch 224 serves to generate an electrical signal showing when the head is properly aligned with a track by indicating that detenting has indeed taken place.

Whereas the aforegoing new description indicates how shaft 94 and therefore the lead screw 92 is rotated to displace the head 88, it must be noted that this arrangement may be such that the pins are so arranged and located with respect to the other geometry of the apparatus that a single input pulse to a solenoid will cause a rotation of the lead screw 92, which will cause the head to move exactly from one track to the next. This constitutes a greatly simplified and reliable mechanism for head displacement which constitutes an important feature of the invention.

Figure 5:
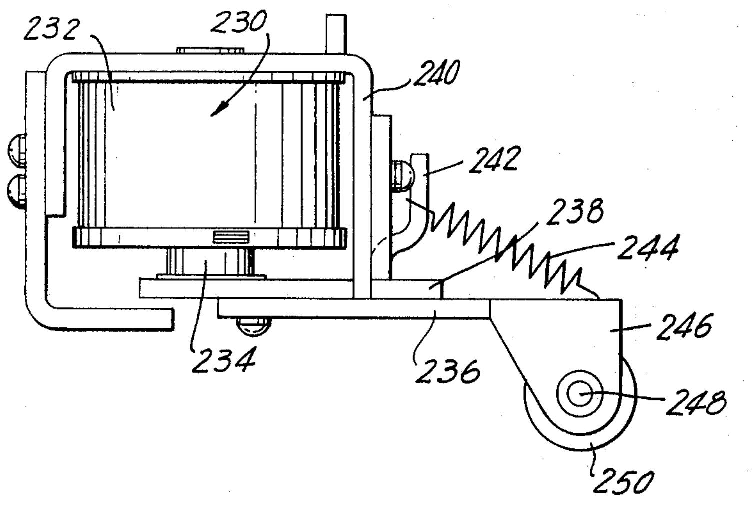
FIG. 5 is a side view of a pinch roller control which controls the driving of data cards into and out of the apparatus of the invention.

FIG. 5 illustrates another feature of the invention notably the pinch roller control which renders effective the continuously operating capstan or capstans employed in accordance with the invention. In FIG. 5 is illustrated a solenoid 230 having a winding 232 and a center core 234. A lever 236 is mounted to the armature 238 supported pivotally at 239 by a bracket member 240, the armature being in a position to be attracted by or displaced from the center core 234.

Mounted on a further bracket member 242 is a spring 244, one end of which is connected to the lever 236. Ears such as indicated at 246, support a pin 248 which in turn supports the pinch roller 250. The pinch roller 250, it will be noted, corresponds to the pinch rollers employed in the devices 72 and 74 indicated hereinabove with respect to FIG. 3.

It will thus now be obvious that it is readily possible to selectively operate one of the pinch roller arrangements 72 or 74 and since the capstans associates therewith will be operating to rotate continuously in opposite rotary directions, selection of one of the pinch roller arrangements 72 or 74 will determine the direction of drive applied to a card inserted into the system.

Referring next to FIG. 3, attention is directed to the light emitting diodes indicated diagrammatically at 270 and 272. These, it will be seen are displaced from one another considered in the longitudinal direction of the apparatus. These light generating diodes have associated therewith appropriate photocells for picking up signals which will be generated when a data card passes between the light generating diodes and the photocells, which are not shown in the drawing but which are located, for example, in the card bed 38 whereat they are spaced from diodes 270 and 272. The position of the diode 272 is such that its associated sensor will indicate the presence of a data card in a position of rest in the machine, the signal being generated being employed to warn against the insertion of a second card. The signal generated by the use of diode 270 and its associated sensor will be effective to generate a signal which may control, for example, the commencement of writing effected through the head 88. The combination of signals derived from the sensors associated with diodes 270 and 272 may be used to control the card loading process.

Figure 6:
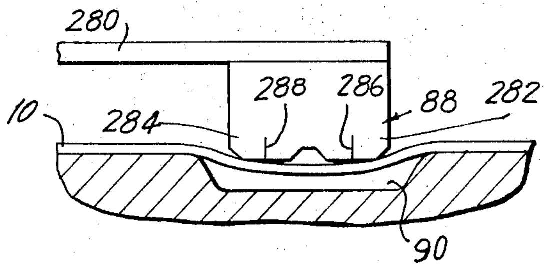
FIG. 6 is a diagrammatic illustration of the arrangement of a magnetic head and trough employed in accordance with the invention.

Finally, FIG. 6 illustrates diagrammatically the use of the trough 90 in association with the head 88.

First of all, in FIG. 6, it will be noted that the head as is supported in cantilever manner on leaf spring member 280. (Note: member 280 might be also a rigid member, spring loaded toward trough 90). Head 88 includes, for example, a reading head portion 282 and a writing head portion 284 these being provided with head gaps 286 and 288 in a conventional construction.

The head 88 and the trough 90 are of such cross-section and relationship that the card 10 will be urged by the spring action of 280 into the trough 90 thereby assuring a maximum contact (wrap) between the head 88 and the flexible card 10 for purposes of the reading and writing of data.

With the use of a two gap read- after- write-head, there is the possibility of recording and reading on a single track during forward motion or reading only during the forward motion. Under this condition the write head is made somewhat wider than the read head so as to erase fully all old track data, while only reading the inner portion of the track.

With the use of a lower cost head which has a full track width erase gap and a narrower gap suitable for either writing or reading, writing takes place on forward motion accompanied by erasing ahead of that gap while verifying occurs during reverse motion. Reading only is performed on the forward motion.

In a typical application employing a data card, recording of the tracks will be sequential. Thus, for example, in an editing system, sequential tracks on the card represents sequential lines of text. When successive tracks are to be written or read, the sequence may be the following: (1) with read- after- right-head, there will be a recording and a verification on track *n* on forward motion whereafter reverse motion is initiated and there is a stepping to the next track simultaneously. (2) with a read/write head there is a recording during forward card motion, a verification during reverse card motion and then a stepping on-to the next track.

In the apparatus of the invention, the card and head motions are independent and may thus be independently controlled and, if appropriate, overlapped. Track stepping may be verified by sensing that the lead screw has been appropriately turned.

A set of limit switches 47, 49 actuated by magnet 51 in FIG. 3 may be provided which prevent the head from being stepped in either direction beyond the extreme limit tracks.

Loading of a card is simply accomplished in the apparatus of the invention by inserting such card into the throat at the front of the machine. With a sensing by the aforesaid photocell system that no card is in the system and with a sensing of the insertion of a new card into the system by the other photocell arrangement, there may be caused an engagement of the reverse capstan control to drive the card to its position of rest within the system. Unloading is accomplished by driving the card with the forward capstan pinch roller arrangement until it becomes accessible to an operator at the front of the machine.

A misloading of a card such as, for example, by inserting the card with its cut off corner on the wrong side might cause the card to sit at rest position with the card out of reach of the forward capstan pinch roller combination. This might constitute a difficult condition to clear, aside from the fact that the solenoid operated lever 122 is provided for purposes of ejection. This lever can be controlled by a manual push-button which operates to generate a signal which is transmitted to the associated solenoid.

There will now be obvious to those skilled in the art many modifications and variations of the construction set forth hereinabove. These modifications and variations will not depart from the scope of the invention, if defined by the following claims.

What is claimed is:

1. Data card transport and read/write apparatus comprising first means to receive a card having multiple parallel data tracks thereon, second means to displace the thusly received card in opposite directions, third means to scan a track on the thusly displaced card for purposes of reading and/or writing data thereon, and fourth means for incrementally stepping said third means from track to track, said third means including a lead screw, and a track scanning head coupled to said screw and responsive to rotation of the latter for being displaced from track to track, said fourth means incrementally rotating said screw, said fourth means including a disc mounted on said screw, pins on said disc and parallel with said screw, members selectively operable to engage and displace said pins to rotate the screw in one of two opposite rotary directions, and solenoids to actuate said members.

2. Apparatus as claimed in claim 1 wherein said disc is provided with peripheral notches corresponding in number to said pins, said fourth means including a rider adapted to engage sequentially in said notches to hold said disc and thus said screw in positions whereat said head is aligned selectively with respective of said tracks, means resiliently bearing against said rider to maintain the same in said notches, and arms on said members to act against the latter said means to release said rider concomitantly with the displacement of the pins by said members.

3. Apparatus as claimed in claim 2 comprising a magnet on said rider and a reed switch adjacent the magnet to determine when the rider is in and out of the notches.

4. Apparatus as claimed in claim 3 wherein said members are hook shaped members pivotally arranged on opposite sides of said disc and adapted for displacement from a rest position to sweep said pins through a limited displacement until said rider engages in a notch and then to return to said rest position, said fourth means including springs allowing said hook shaped members to brush past said pins on returning to said position of rest, said pins being maintained in stationary attitude by engagement of the rider in one of said notches while the members brush past the pins.

5. Data card transport and read/write apparatus comprising first means to receive a card having multiple parallel data tracks thereon, second means to displace the thusly received card in opposite directions, third means to scan a track on the thusly displaced card for purposes of reading and/or writing data thereon, and fourth means for incrementally stepping said third means from track to track, said third means including a lead screw, and a track scanning head coupled to said screw and responsive to rotation of the latter for being displaced from track to track, said fourth means incrementally rotating said screw, said apparatus further comprising a pivoted arm including one end engaged by and displaced by said head and a second end, an indicator on said second end, and an index cooperating with said indicator to indicate the track being scanned.

6. Data card transport and read/write apparatus comprising first means to receive a card having multiple parallel data tracks thereon, second means to displace the thusly received card in opposite directions, third means to scan a track on the thusly displaced card for purposes of reading and/or writing data thereon, and fourth means for incrementally stepping said third means from track to track, said third means including a lead screw, and a track scanning head coupled to said screw and responsive to rotation of the latter for being displaced from track to track, said fourth means incrementally rotating said screw, the card having a position of rest, said apparatus further comprising a lever for ejecting the card from said position of rest and a solenoid to actuate said lever.

7. Data card transport and read/write apparatus comprising first means to receive a card having multiple parallel data tracks thereon, second means to displace the thusly received card in opposite directions, third means to scan a track on the thusly displaced card for purposes of reading and/or writing data thereon, and fourth means for incrementally stepping said third means from track to track, said third means including a lead screw, and a track scanning head coupled to said screw and responsive to rotation of the latter for being displaced from track to track, said fourth means incrementally rotating said screw, said apparatus further comprising a cantilever spring mounting for said head, said first means including a bed over which said card passes, said bed being provided with a trough corresponding with said head, said head pressing the card into said trough thereby permitting intimate card-to-head conformity and contact.

* * * * *

UNITED STATES PATENT OFFICE
CERTIFICATE OF CORRECTION

Patent No. 3,760,391 Dated Sept. 18, 1973

Inventor(s) Edgar Wolf, Edward Lau, Eisenkramer

It is certified that error appears in the above-identified patent and that said Letters Patent are hereby corrected as shown below:

In the Specification:

Column 1, line 66: change "manget" to --magnet--

Column 3, line 25: change "capstant" to --capstan--

Column 5, line 14: change "wasl" to --was--

Column 6, line 42: change "thewobble" to --the wobble--

Column 7, line 32: change "associates" to --associated-

Column 8, line 41: change "apa" to --appa- -- line 42 change "pratus" to --ratus--

Signed and sealed this 11th day of June 1974.

(SEAL)
Attest:

EDWARD M.FLETCHER,JR.
Attesting Officer

C. MARSHALL DANN
Commissioner of Patents